United States Patent
Muthukrishnan et al.

(10) Patent No.: US 7,324,541 B2
(45) Date of Patent: Jan. 29, 2008

(54) SWITCHING DEVICE UTILIZING INTERNAL PRIORITY ASSIGNMENTS

(75) Inventors: Raman Muthukrishnan, Santa Clara, CA (US); Anujan Varma, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 843 days.

(21) Appl. No.: 10/744,198

(22) Filed: Dec. 22, 2003

(65) Prior Publication Data

US 2005/0135355 A1    Jun. 23, 2005

(51) Int. Cl.
H04L 12/54    (2006.01)

(52) U.S. Cl. .................. 370/429; 370/462

(58) Field of Classification Search ........... 370/389, 370/231, 474, 465, 444, 476, 412, 391, 428, 370/429, 447, 461, 462
See application file for complete search history.

(56) References Cited

U.S. PATENT DOCUMENTS

| | | | |
|---|---|---|---|
| 4,092,732 A | 5/1978 | Ouchi | |
| 4,331,956 A | 5/1982 | Anderson | |
| 4,335,458 A | 6/1982 | Krol | |
| 4,695,999 A | 9/1987 | Lebizay | |
| 5,127,000 A | 6/1992 | Henrion | |
| 5,191,578 A | 3/1993 | Lee | |
| 5,260,935 A | 11/1993 | Turner | |
| 5,274,758 A | 12/1993 | Kuddes | |
| 5,442,752 A | 8/1995 | Styczinski | |
| 5,483,523 A | 1/1996 | Nederlof | |
| 5,535,221 A * | 7/1996 | Hijikata et al. ............. 714/708 |
| 5,649,157 A | 7/1997 | Williams | |
| 5,682,493 A | 10/1997 | Yung | |
| 5,832,278 A | 11/1998 | Pham | |
| 5,848,434 A | 12/1998 | Young | |
| 5,859,835 A | 1/1999 | Varma | |
| 5,860,097 A | 1/1999 | Johnson | |
| 5,898,688 A * | 4/1999 | Norton et al. ............. 370/362 |
| 5,978,951 A | 11/1999 | Lawler | |
| 6,055,625 A | 4/2000 | Nakada | |
| 6,061,345 A | 5/2000 | Hahn | |
| 6,167,508 A | 12/2000 | Farrell | |
| 6,170,032 B1 | 1/2001 | Izzard | |
| 6,188,698 B1 | 2/2001 | Galand | |
| 6,282,686 B1 | 8/2001 | Cypher | |
| 6,321,306 B1 | 11/2001 | Arimilli | |

(Continued)

*Primary Examiner*—Kwang Bin Yao
*Assistant Examiner*—Candal Elpenord
(74) *Attorney, Agent, or Firm*—Douglas J. Ryder; Ryder IP Law, PC

(57) ABSTRACT

In general, in one aspect, a switching device is described that includes a segmentation unit to receive packets and divide packets having a length greater than a maximum segment length into multiple segments. A plurality of queues associated with a source and a destination stores the segments. A request generator generates requests that include external factors including amount of data contained in the queue and at least some subset of priority and age. A scheduler receives the requests and assigns the requests an internal priority based on the external factors. The scheduler processes the requests for the queues by internal priority in order to generate grants. A framer, responsive to the scheduler, aggregates a plurality of segments for the queues that received a grant to form a frame and to transmit the frame to an associated destination. The frame may contain segments associated with different packets.

32 Claims, 15 Drawing Sheets

U.S. PATENT DOCUMENTS

| | | |
|---|---|---|
| 6,359,891 B1 | 3/2002 | Bergantino |
| 6,408,378 B1 | 6/2002 | O'Connor |
| 7,161,906 B2 * | 1/2007 | Dell et al. .................. 370/231 |
| 7,212,525 B2 * | 5/2007 | Moriwaki et al. .......... 370/386 |
| 7,224,703 B2 * | 5/2007 | Antal et al. ................. 370/473 |
| 2001/0009552 A1 * | 7/2001 | Parruck et al. ............. 370/412 |
| 2001/0038629 A1 * | 11/2001 | Shinohara ................... 370/394 |
| 2003/0182480 A1 * | 9/2003 | Varma et al. ................. 710/52 |
| 2004/0017778 A1 * | 1/2004 | Bansal et al. ................ 370/242 |
| 2004/0037302 A1 * | 2/2004 | Varma et al. ............... 370/412 |
| 2005/0015388 A1 * | 1/2005 | Dasgupta et al. ........... 707/100 |

* cited by examiner

| REQUEST ENCODING | AMOUNT OF DATA IN QUEUE (IN TERMS OF FRAMES) |
|---|---|
| 0000 | EMPTY |
| 0001 | 0 - 1/4 FRAME (1/4 EXCLUDED) |
| 0010 | 1/4 TO 1/2 FRAME |
| 0011 | 1/2 TO 3/4 FRAME |
| 0100 | 3/4 TO 1 FRAME |
| 0101 | 1 TO 1.25 FRAMES |
| 0110 | 1.25 TO 1.50 FRAMES |
| 0111 | 1.50 TO 1.75 FRAMES |
| 1000 | 1.75 TO 2.00 FRAMES |
| 1001 | 2.00 TO 2.25 FRAMES |
| 1010 | 2.25 TO 2.50 FRAMES |
| 1011 | 2.50 TO 2.75 FRAMES |
| 1100 | 2.75 TO 3.00 FRAMES |
| 1101 | 3.00 TO 3.26 FRAMES |
| 1110 | 3.25 TO 3.50 FRAMES |
| 1111 | > 3.50 FRAMES |

FIG. 7

| HIGHEST PRIORITY REQUST THAT IS PART OF THE FRAME | FRAME STATUS (PARTIAL/FULL) | SPL 3-BIT |
|---|---|---|
| 0 | FULL FRAME | 0 |
| 1 | FULL FRAME | 1 |
| 2 | FULL FRAME | 2 |
| 3 | FULL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

FIG. 8A

| HIGHEST PRIORITY REQUST THAT IS PART OF THE FRAME | FRAME STATUS (PARTIAL/FULL AND AGING) | SPL 3-BIT |
|---|---|---|
| 0 | FULL FRAME OR AGED OUT PARTIAL FRAME | 0 |
| 1 | FULL FRAME OR AGED OUT PARTIAL FRAME | 1 |
| 2 | FULL FRAME OR AGED OUT PARTIAL FRAME | 2 |
| 3 | FULL FRAME OR AGED OUT PARTIAL FRAME | 3 |
| 0 | PARTIAL FRAME | 4 |
| 1 | PARTIAL FRAME | 5 |
| 2 | PARTIAL FRAME | 6 |
| 3 | PARTIAL FRAME | 7 |

FIG. 8B

| SPL | NUMBER OF INTERATIONS | CUMULATIVE NUMBER OF ITERATIONS |
|---|---|---|
| 0 | 3 | 3 |
| 1 | 2 | 5 |
| 2 | 2 | 7 |
| 3 | 2 | 9 |
| 4 | 2 | 11 |
| 5 | 2 | 13 |
| 6 | 2 | 15 |

FIG. 10

| PRIORITY 3 | PRIORITY 2 | PRIORITY 1 | PRIORITY 0 |
|---|---|---|---|
| 0 | 1 | 0 | 1 |

FIG. 14

SWITCHING DEVICE UTILIZING INTERNAL PRIORITY ASSIGNMENTS

BACKGROUND

Store-and-forward devices, such as switches and routers, are used in packet networks, such as the Internet, for directing traffic at interconnection points. The store-and-forward devices include a plurality of line cards for receiving and transmitting data from/to external sources. The line cards are connected to one another via a backplane and a switching fabric. The backplane provides data paths between line cards and the switching fabric and the switching fabric provides configurable data paths between line cards. The line cards receiving data from external sources (ingress ports) receive data (packets) of various sizes. The data received are stored in queues prior to being transmitted to the appropriate line cards for transmission to external sources (egress ports). The packets include a header that identifies the destination of the packet. The packet is stored in the queue associated with that destination. The packet may also identify a priority for the data and the ingress port may also include queues for the various priorities.

The ingress ports send requests for transmitting data to a scheduler within the switching fabric. The scheduler generates grants for the queues that should transmit packets therefrom. The packets are switched through a crossbar switching matrix in batches. A batch consists of at most one packet selected from each input port. Thus, no more than one of the packets is destined for each output port. The packets in a batch are transferred in parallel across the crossbar switching matrix. While the packets from a scheduled batch are being transferred through the crossbar, the scheduler can select the packets to form the next batch, so that the transmission of the new batch of packets can start as soon as transmission of the current batch ends. At the end of the batch of packets, the fabric scheduler re-configures the crossbar switching matrix so as to connect the input ports to the corresponding output ports where the next packet is destined to.

Because the packets are transferred in batches, the switching paths in the crossbar switching matrix are kept unchanged for the duration of the longest packet being transferred across the crossbar in that batch. When the packets are of variable size (as is the case for packets generated by most network protocols in the industry), this results in wasted bandwidth. For example, when a 50-byte packet and a 1500-byte packet are part of the same batch, the crossbar is maintained in the same configuration for the duration of the 1500-byte packet, and only $\frac{1}{30}^{th}$ of the bandwidth of the path is used by the 50-byte packet.

One solution for avoiding the inefficiency caused by variable-size packets is to divide the packets into fixed-size units before switching through the crossbar switching fabric, and combine the fragments into the original packet at the output of the fabric. The packet fragments switched through the crossbar are called "segments" or "cells". The fabric scheduler selects at most one cell from each input port to form a batch, such that the destination port numbers associated with the cells in the same batch are distinct. The cells in the same batch are then transmitted in parallel. Because the cells are of the same size, no bandwidth is wasted in the crossbar. The cells switched through the fabric have a fixed size. This fixed size is typically chosen to correspond to the size of the smallest packet switched by the fabric, plus the size of any internal headers added by the router or switch before passing the packet through the fabric.

The fabric scheduler computes a new schedule for the batch of cells during the transmission time of a cell. In a high-speed switch, this time interval can be extremely short. For example, with a cell size of 64 bytes and a port rate of 10 Gigabits/second, the fabric scheduler schedules a new batch of cells every 51.2 nanoseconds. The crossbar switching matrix is also configured at intervals of 51.2 nanoseconds. As the port speed is increased, both the fabric scheduler and the crossbar reconfiguration are made correspondingly faster. This is especially a problem when an optical switching device is used as the crossbar switching matrix. While supporting very high data rates, many of the optical switching devices have long reconfiguration times. This makes them unsuitable for use in a cell-based fabric.

Another difficulty with the cell-based fabric is that it is difficult to separate the crossbar switching matrix (the data path) and the fabric scheduler, because the delays in communication between them can become a bottleneck. During every scheduling cycle, the header information (in particular, the destination port number) from cells stored in the input buffers of the crossbar matrix is passed to the fabric scheduler, and the crossbar configuration setting is communicated back from the scheduler to the crossbar matrix. If the scheduler is physically separated from the crossbar matrix (on separate chips or circuit boards), the delays in communication between the two may make it difficult to achieve the scheduling rate needed in a high-speed router or switch.

BRIEF DESCRIPTION OF THE DRAWINGS

The features and advantages of the various embodiments will become apparent from the following detailed description in which:

FIG. 7 illustrates an exemplary encoding scheme for quantizing the amount of data based on frames, according to one embodiment;

FIGS. 8A-B illustrate exemplary SPL mapping tables, according to one embodiment;

FIG. 10 illustrates an exemplary SPL iteration table, according to one embodiment;

FIG. 14 illustrates an exemplary grant service bitmap, according to one embodiment.

DETAILED DESCRIPTION

Store-and-forward devices, such as switches and routers, are used in packet networks, such as the Internet, for directing traffic at interconnection points. Store-and-forward devices include a plurality of interface modules, a switch fabric for selectively connecting different interface modules, and a backplane for connecting the interface modules and the switching fabric. The interface modules include receivers (ingress ports) to receive data from and transmitters (egress ports) to transmit data to multiple sources (e.g., computers, other store and forward devices) over multiple communication links (e.g., twisted wire pair, fiber optic, wireless). The sources may be capable of transmitting/receiving data at different speeds, different quality of service, etc. over the different communication links. The interface modules can transmit/receive data using any number of protocols including Asynchronous Transfer Mode (ATM), Internet Protocol (IP), and (Time Division Multiplexing) TDM. The data may be variable length or fixed length blocks, such as cells, packets or frames.

The data received from external sources is stored in a plurality of queues. The queues may be stored in any type of storage device and preferably are a hardware storage device such as semiconductor memory, on-chip memory, off-chip memory, field-programmable gate arrays (FPGAs), random access memory (RAM), or a set of registers. The interface modules may be line cards or chips contained on line cards. A single line card may include a single interface module (receiver or transmitter) or multiple interface modules (receivers, transmitters, or a combination). The interface modules may be Ethernet (e.g., Gigabit, 10 Base T), ATM, Fibre channel, Synchronous Optical Network (SONET), Synchronous Digital Hierarchy (SDH) or various other types. A line card having multiple interface modules may have the same type of interface modules (e.g., ATM) or may contain some combination of different interface module types. The backplane may be electrical or optical.

Figure 1:
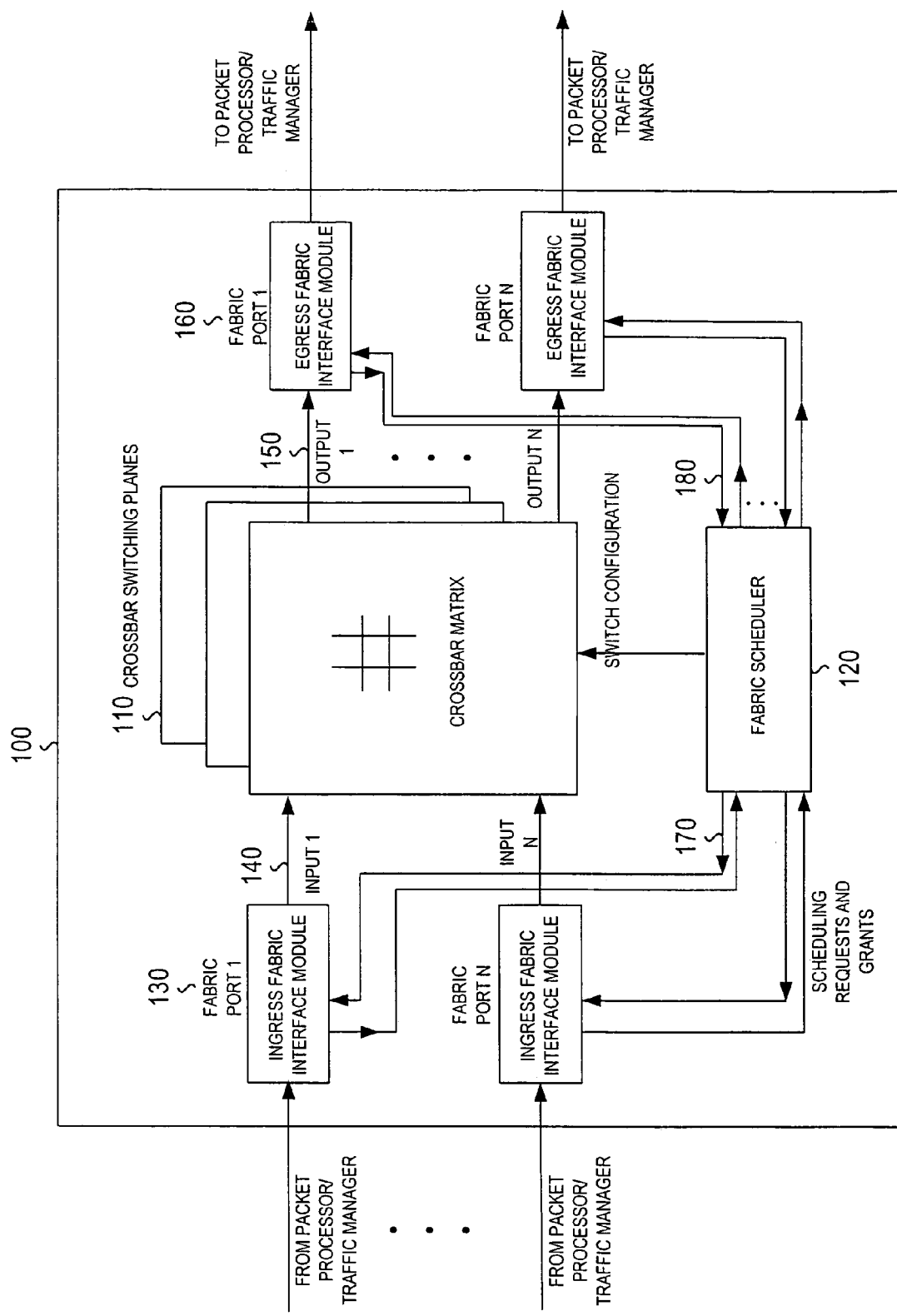
FIG. 1 illustrates an exemplary block diagram of a switching fabric, according to one embodiment.

FIG. 1 illustrates an exemplary block diagram of a switching fabric 100. The switching fabric 100 introduces a data aggregation scheme wherein the variable-size packets arriving into the store-and-forward device (e.g., router, switch) are first segmented into smaller units (segments) and then aggregated into convenient blocks ("frames") for switching. The switching fabric 100 includes a switching matrix 110 (made up of one or more crossbar switching planes), a fabric scheduler 120, ingress fabric interface modules 130, input data channels 140 (one or more per fabric port), output data channels 150 (one or more per fabric port), egress fabric interface modules 160, ingress scheduling channels 170 and egress scheduling channels 180. According to one embodiment, the data channels 140, 150 are separate from the scheduling channels 170, 180. In an alternate embodiment, the scheduling information can me multiplexed with data and sent over the same physical links, and the scheduler 120 can be integrated with one or more crossbar planes 110 as well. However, the scheduling function remains logically separate from the data path.

The ingress fabric interface module 130 receives packets from the packet processor/traffic manager device on a line card. The packet processor/traffic manager is responsible for processing the packets arriving from the external links, determining the fabric port number associated with the incoming packet (from a header lookup), and attaching this information to the packet for use by the switching fabric 100. The ingress fabric interface module 130 receives the packets, stores the packets in associated queues, and sends the packets to the switching matrix 110 for transfer to a different line card. The egress fabric interface modules 160 are responsible for receiving packets arriving from the switching matrix 110 (typically from a different line card), and passing them on for any egress processing needed in a line card and subsequently for transmission out on the external links. It should be noted that a fabric port may aggregate traffic from more than one external port (link) associated with a line card. A pair of ingress and egress fabric interface modules 130, 160 is associated with each fabric port. When used herein the term fabric port may refer to an ingress fabric interface module and/or an egress fabric interface module. An ingress fabric interface module may be referred to as a source fabric port, a source port, an ingress fabric port, an ingress port, a fabric port, or an input port. Likewise an egress fabric interface module may be referred to as a destination fabric port, a destination port, an egress fabric port, an egress port, a fabric port, or an output port.

The ingress fabric interface modules 130 store the packets arriving from the packet processor/traffic manager in a set of queues. The packets destined to the egress fabric interface modules 160 are maintained in a separate queue (isolated from each other). In addition, the packets destined to a specific egress fabric interface module 160 can further be distributed into multiple queues based on their class of service or relative priority level. These queues may be referred to as virtual output queues. The packets may be broken down into segments and the segments stored in the queues. The segments can be variable size but are limited to a maximum size.

Figure 2:
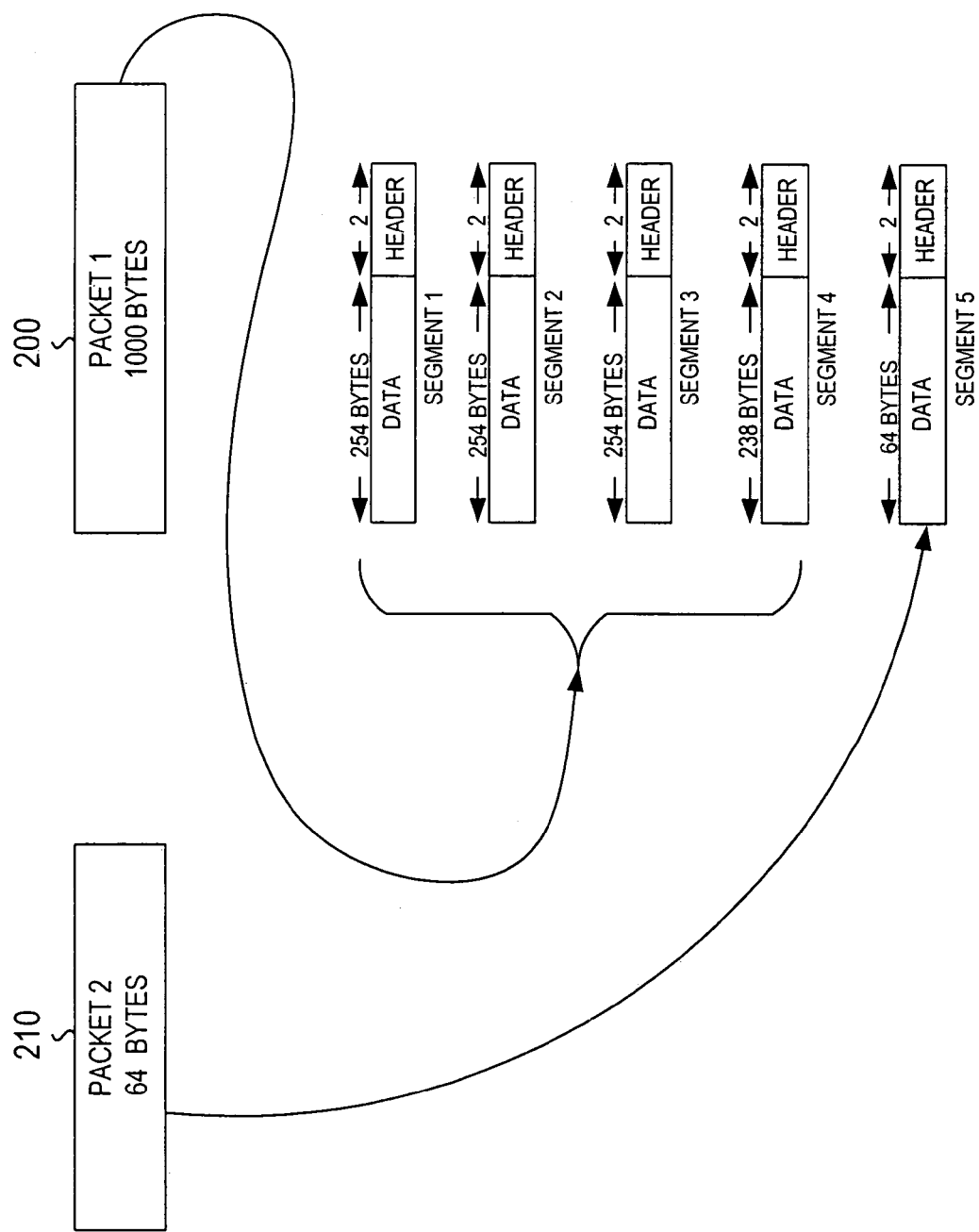
FIG. 2 illustrates an exemplary distribution of packets being stored as segments in a single queue within an ingress fabric interface module, according to one embodiment.

FIG. 2 illustrates an exemplary distribution of packets being stored as segments in a single queue (corresponding to specific destination port and priority level) within an ingress fabric interface module. Two packets are received from the packet processor/traffic manager device on the line card. The first packet 200 is 1000 bytes and the second packet 210 is 64 bytes. The maximum size of a segment is 256 bytes (254 data bytes and a 2 byte segment header). The first packet (1000 bytes) 200 is broken into three 254 byte maximum data size segments (3×254=762 bytes) and a fourth segment of 238 bytes of data. The four segments have a two byte segment header added and the overall segments (data and header) are stored in the queue. Accordingly, the four overall segments include three 256 byte segments and a 240 byte segment. The second packet (64 bytes) 210 is less than the maximum segment size so it has the two byte header appended to it and is saved in the queue as a 66 byte segment.

The segment header identifies the queue in which the segment is to be placed upon its arrival in the egress fabric interface module. The number of queues is dependent on number of priority levels (or class of services) associated with the packet. Furthermore, the number of queues may also be dependent on number of ingress fabric interface modules that can send data to the egress fabric interface module. For example, if the egress fabric interface module receives data from 8 line card ports (ingress fabric interface modules) and the line card ports support 4 levels of priority for packets to that egress fabric interface module, then the segments arriving at the egress fabric interface module may be placed in one of 32 queues (8 ingress fabric interface modules×4 priorities per ingress module). Therefore, a minimum of 5 bits are needed in the segment header to identify one of the 32 queues. The segment header also includes an "End of Packet" (EOP) bit to indicate the position of the segment within the packet where it came from. The EOP bit is set to 1 for the last segment of a packet, and 0 for the other segments. This enables the egress modules to detect the end of a packet.

Figure 3:
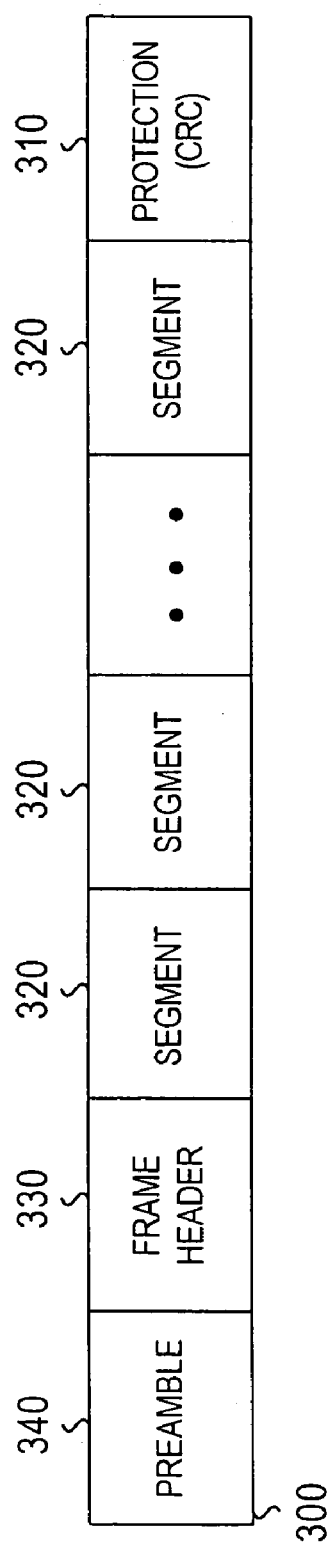
FIG. 3 illustrates an exemplary format of a frame being transmitted by an ingress fabric interface module to an egress fabric interface module via the crossbar plane, according to one embodiment.

The segments stored in its queues are aggregated into frames by the ingress fabric interface module 230 before transmission to the crossbar matrix 210. FIG. 3 illustrates an exemplary format of a frame 300 (made up of multiple segments) being transmitted by an ingress fabric interface module to an egress fabric interface module via the crossbar plane. The frame 300 includes a preamble 340, a frame header 330, one or more segments 320, and a protection/error detection field 310 (e.g., a Cyclic Redundancy Code (CRC)). The frame header 330 contains fields identifying the ingress and egress fabric interface modules associated with the frame, and other optional information. This information is used by the egress fabric interface module for data identification and for error checking. The preamble 340 at the beginning of the frame does not carry data, it is used for establishing synchronization at the egress fabric interface module.

The maximum size of the frame is a design parameter. The time taken to transmit the maximum-size frame is referred to as the "frame period." This interval is the same as a scheduling interval (discussed in further detail later). The frame period can be chosen independent of the maximum packet size in the system. Typically, the frame period is chosen such that a frame can carry several maximum-size segments. The frame period is often determined by the reconfiguration time of the crossbar data path. For example, the switching time of certain optical devices are currently of the order of microseconds. If such devices are used for the data path, the frame period is on the order of microseconds. Electronic switching technologies, on the other hand, are significantly faster, allowing frame periods in the range of tens to hundreds of nanoseconds. Another factor that needs to be taken into account while choosing the frame period is the overhead in synchronizing the egress fabric interface modules with the data streams at the start of a frame. Data streams are broken at the end of a frame and the new arriving frame may be from a different ingress fabric interface module (resulting in a change in frequency and/or phase of the clock associated with the data stream). Accordingly, the egress fabric interface modules re-establish synchronization at the boundary of every frame.

The ingress fabric interface module constructs a frame by de-queuing one or more segments from its queues when instructed to do so by a grant from the fabric scheduler (discussed in further detail later). A grant may be received by an ingress fabric interface module during each frame period. The grant identifies the subset of queues from which data need to be de-queued based on the destination fabric port (egress fabric port module). This de-queuing of segments proceeds until the frame is full. Because the segments cannot further be broken up, and a frame consists of a whole number of segments, the frame constructed may not have the same size, but will be within the maximum size specified. Alternatively, the frames that do not equal the maximum frame size can be padded to the maximum size so that the frames are the same size.

By way of example, assume that the maximum frame size is 1000 bytes and that ingress port 1 just received a grant to transmit data to egress port 2 (queue 2). Assume that queue 2 has the following segments stored therein: segment 1-256 bytes, segment 2-256 bytes, segment 3-200 bytes, segment 4-256 bytes, segment 5-64 bytes, and segment 6-128 bytes. The frame would be constructed to include as many full segments as possible. In this case the first 4 segments would be selected and utilize 968 bytes. As the fifth segment cannot fit within the frame without exceeding the maximum frame size, the segment is not included. The frame is transmitted as a 968 byte frame. Alternatively, the frame can be padded to the maximum 1000 byte frame size.

If there are multiple queues (based on priority, class of service) associated with a specific destination, the ingress module chooses one or more queues from this subset based on a scheduling discipline. The scheduling discipline may be based on priority (e.g., highest priority first). That is, the queues may be serviced in order of priorities, starting from the highest priority queue and proceeding to the next priority level when the current priority level queue is empty. This de-queuing of segments proceeds through queues (priorities) until the frame is full.

By way of example, assume the same maximum frame size of 1000 bytes and that ingress port 1 just received a grant to transmit data to egress port 2 (queues 4-6 corresponding to priorities 1-3). Assume that queue 4 includes segment 1-256 bytes and segment 2-256 bytes; queue 5 includes segment 3-200 bytes; and queue 6 includes segment 4-256 bytes, segment 5-64 bytes, and segment 6-128 bytes. The frame would include segments 1 and 2 from queue 4, segment 3 from queue 5, and segment 4 from queue 6. These 4 segments selected from three different queues (priorities) generate a 968 byte frame. The frame may be transmitted as a 968 byte frame or alternatively may be padded to the maximum 1000 byte frame size.

While constructing the frame, the segments from multiple packets may be interleaved within a frame. Because the segment header provides identifying information for re-assembling them into the original packets, such interleaving does not violate data integrity. The only constraint to be satisfied is that two segments from the same packet should not be sent out of order. By way of example, assume that packet 1 includes segments 1-5 and packet 2 includes segments 6-8 and that both packets (all segments associated with) can fit within the maximum size frame. The order of the packets in the frame may be 1, 2, 3, 6, 4, 7, 8, and 5. That is the packets are interleaved within one another but the order of the segments associated with a packet are in order.

When there is only a single crossbar switching plane present, the frame is transmitted in bit-serial fashion through the crossbar planes. When multiple crossbar planes are used, the contents of the frame are striped over the available crossbar planes. Striping may be performed at the bit, byte, or word level. Additional channels may be used for protection (error detection and correction).

Referring back to FIG. 1, the fabric scheduler 120 is responsible for scheduling transmissions from the ingress fabric interface modules 130 to the egress fabric interface module 160 via the crossbar matrix 110. The operation of the scheduler 120 is synchronous with respect to a frame clock. During each cycle of the frame clock, the ingress fabric interface modules 130 transmit information (e.g., requests) on the packets waiting in their queues to the scheduler 120. This information is sent across the links 170 connecting the fabric scheduler 120 to the ingress fabric interface modules 130. Information transmitted from the ingress fabric interface modules 130 to the fabric scheduler 120 in each cycle of the frame clock can be regarded as a set of requests from the fabric ports for use of the crossbar datapath. The information provided by the ingress fabric interface modules 130 consists of, at a minimum, the destination fabric port numbers associated with its non-empty queues.

For example, assume that the ingress fabric interface module associated with fabric port 1 has five packets in its queue, two of which are destined to fabric port 3, and one each to fabric ports 5, 6 and 7, respectively. Then, the information transmitted from the ingress fabric interface module 1 in that cycle will carry at least one bit corresponding to the fabric ports 3, 5, 6 and 7 to identify the non-empty queues. The information can optionally include many other attributes, such as the amount of data in the queue and the "age" (time interval since a packet was last transmitted) of the queue. In addition, if there are multiple queues associated with each destination port, based on priority or class, then the information may include the amount of data queued at each priority level for each destination port.

A basic fabric scheduler implementation may need only the basic information (ID of non-empty queues) to be passed from the ingress fabric interface modules. More powerful scheduler implementations, supporting additional features, require more information to be passed from the ingress fabric interface modules and higher bandwidth links (or stripping of the requests over multiple links) connecting them to the scheduler.

Based on the information received from the ingress fabric interface modules 130, the fabric scheduler 120 computes a schedule for the crossbar planes 110. The schedule is computed by performing a matching of the requests received from the ingress fabric interface modules 130 and resolving any conflicts therebetween. For example, assume ingress fabric interface module 1 has packets queued for destinations 5 and 7, while ingress fabric interface module 2 has packets queued for destinations 5 and 9. During the matching phase, the scheduler 120 could match both of the ingress modules to destination 5. However, the scheduler 120 would realize the conflict and modify the schedule accordingly. The scheduler 120 may schedule ingress module 1 to send packets to destination 7 and ingress module 2 to send to destination 5, enabling both transmissions to occur in parallel during the same frame cycle. In practice, the fabric scheduler 120 may use criteria such as, the amount of data queued at various priorities, the need to maintain bandwidth guarantees, and the waiting times of packets, in the computation of the schedule.

The scheduler 120 then sets the crossbar matrix (planes) 110 to correspond to this setting. For example, if the fabric scheduler 120 generates a schedule in which the ingress fabric interface module 1 is to transmit a packet in its queue to destination port 4 in the current cycle, the scheduler 120 configures the crossbar matrix 110 to connect ingress port 1 to egress port 4 during the current frame cycle. If there are multiple crossbar planes used to stripe the data, then the planes are set in parallel to the same configuration.

After the fabric schedule 120 computes its schedule, the scheduler 120 communicates back to the ingress fabric interface modules 130 the schedule information (grants) computed. The information sent to particular ingress modules includes, at a minimum, the destination fabric port number to which it was matched. Upon receiving this information, the ingress fabric interface modules 130 de-queue data (segments) from the associated queue(s) and transmit the data (frames) to the crossbar data planes (previously discussed). This is done in parallel by the interface modules 130. Because the fabric scheduler 120 sets the crossbar planes 110 to correspond to the schedule information (grants) communicated to the ingress fabric interface modules 130, the data transmitted by the ingress modules 130 will reach the intended destination egress interface modules 160.

While communicating the schedule information (grants) to the ingress fabric interface modules 130, the fabric scheduler 120 may optionally send information about the computed schedule to the egress fabric interface modules 160. Specifically, the scheduler 120 may send to the egress modules 160 the port number associated with the ingress modules 130 that will be transmitting data to it in that cycle. Although this information can be provided within the data stream itself (as part of header), sending it directly from the fabric scheduler 120 enables the egress modules 160 to detect errors by comparing the source of the arriving data (obtained from the headers) with the scheduler-supplied port number. A mismatch indicates an error or failure in the switch fabric system. The arriving data can be discarded in such an event, thus avoiding delivery of data to an unintended port.

Figure 4:
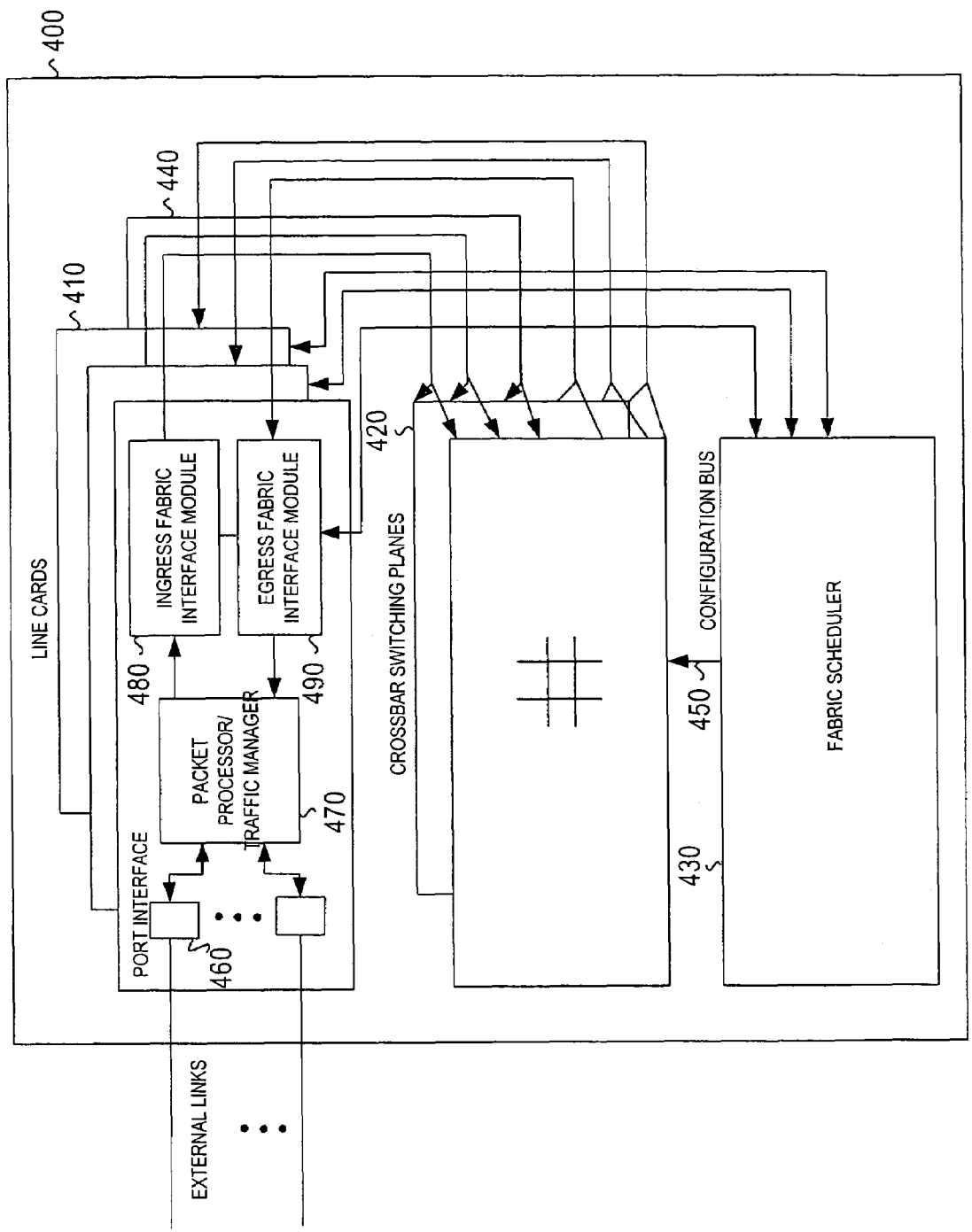
FIG. 4 illustrates an exemplary store-and-forward device showing the individual components interconnected, according to one embodiment.

FIG. 4 illustrates an exemplary store-and-forward device 400 showing the individual components interconnected. The store-and-forward device 400 includes line cards 410, crossbar switching planes 420, a fabric scheduler 430, a backplane 440 made up of a plurality of serial channels for connecting the line cards 410 to the crossbar switching planes 420 and the fabric scheduler 430, and a configuration bus 450 for providing communications between the fabric scheduler 430 and the crossbar switching planes 420. The line cards 410 include port interfaces 460, packet processor and traffic manager devices 470, ingress fabric interface modules 480 and egress fabric interface modules 490. As previously noted a pair of ingress 480 and egress fabric interface modules 490 is associated with a fabric port. There can be one or more fabric ports located on each line card.

The crossbar switching planes 420 and the fabric scheduler 430 reside on one or more switch cards. The backplane 440 (serial channels) form the data path over which packets are transported through the crossbar switching planes 420. When the bandwidth of a single serial channel (link) is inadequate to support the data rate of the fabric port, data is striped over multiple channels. Such striping can be at different granularities (e.g., bit, byte, word). If the data is stripped over several channels, there will be a corresponding number of crossbar planes. The crossbar planes may be separate crossbar matrixes or may be a single crossbar matrix containing multiple planes. Additionally, more links and switching planes may be used to provide speedup, redundancy, error detection and/or error recovery.

Figure 5:
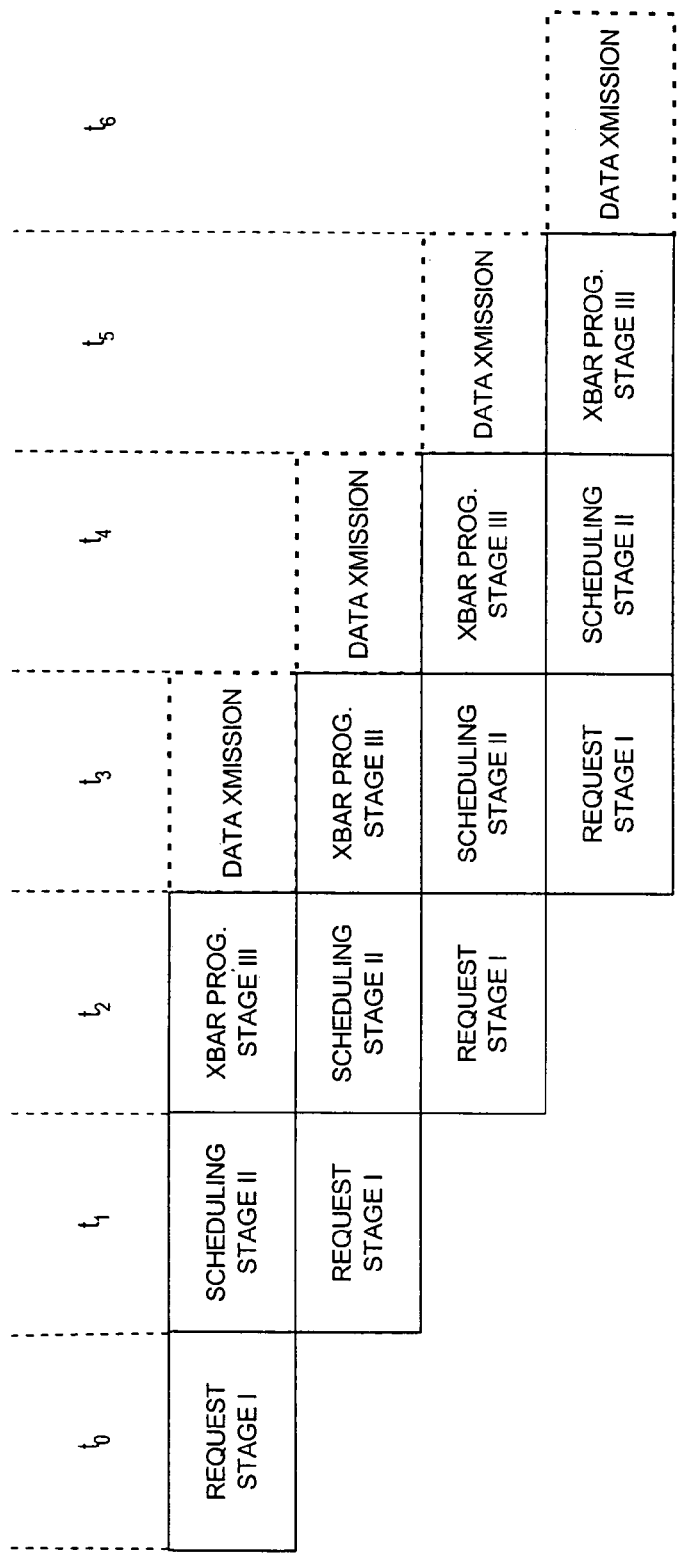
FIG. 5 illustrates an exemplary pipeline schedule for a switch fabric, according to one embodiment.

FIG. 5 illustrates an exemplary pipeline schedule for a switch fabric. The pipeline schedule includes 4 stages. Stage I is the request stage. During this stage, the ingress fabric interface modules send their requests to the fabric scheduler. The scheduler can perform some pre-processing of the requests in this stage while the requests are being received. Stage II is the schedule stage. During this stage, the scheduler matches the inputs (ingress modules) to outputs (egress modules). At the end of this stage, the scheduler sends a grant message to the ingress fabric interface modules specifying the egress modules to which it should be sending data. The scheduler may also send the grants to the egress modules for error detection. Stage III is the crossbar configuration stage. During this stage, the scheduler configures the crossbar planes based on the matches computed during stage II. While the crossbar is being configured, the ingress modules de-queue data from their queues corresponding to the matched egress module, and form a frame. Stage IV is the data transmission stage. During this stage, the ingress modules transmit their data frames across the crossbar. Each stage occurs during a frame period (the basic time unit for system operation). Therefore, each pipeline stage is one frame period.

Figure 6:
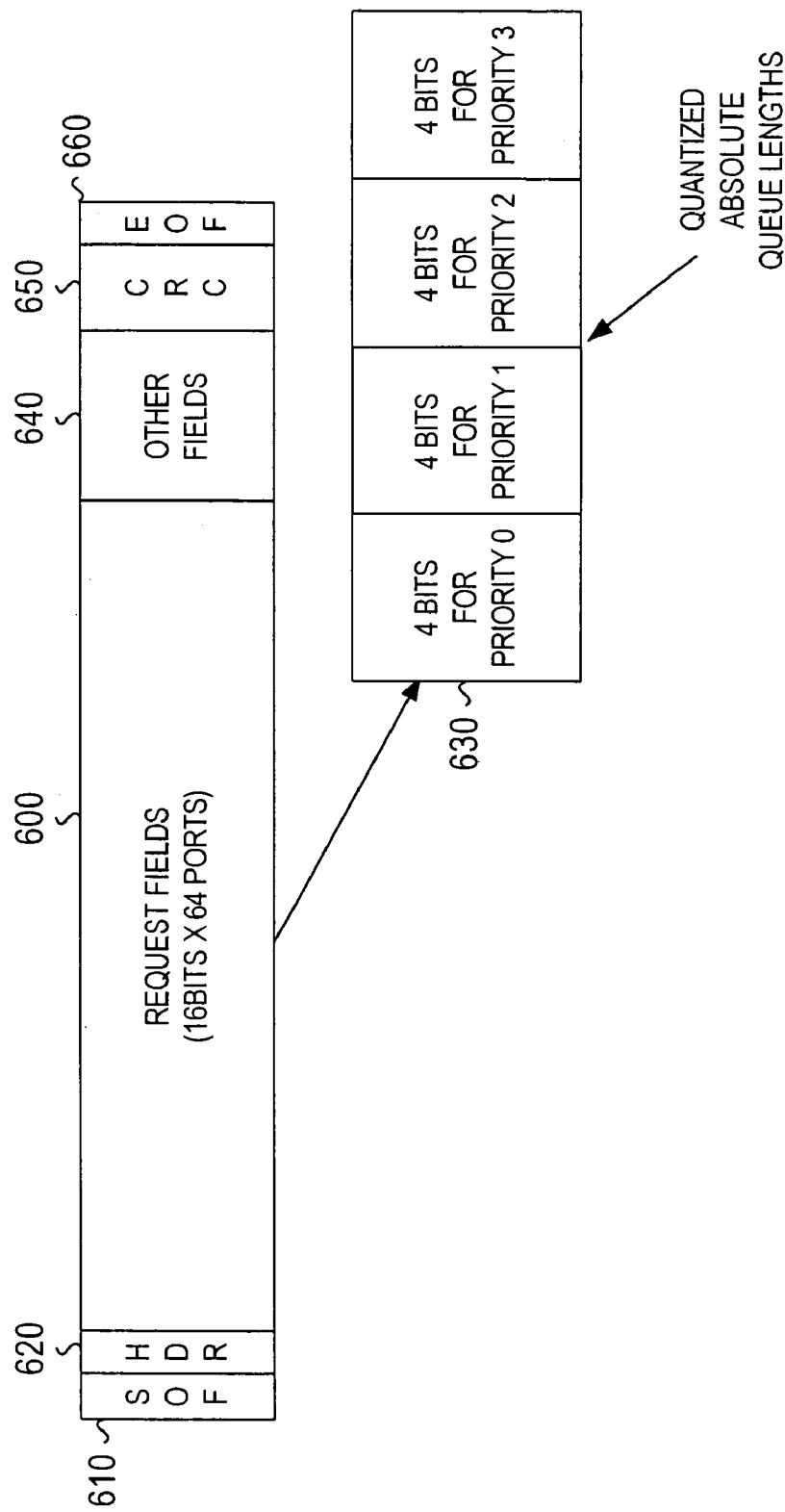
FIG. 6 illustrates an exemplary request frame, according to one embodiment.

The scheduling requests sent from the ingress fabric interface module to the fabric scheduler during each frame period may be formatted as request frames. FIG. 6 illustrates an exemplary request frame 600. The request frame 600 includes a start of frame (SOF) delimiter 610, a header 620, request fields (requests) 630, other fields 640, an error detection/correction field 650, and an end of frame (EOF) delimiter 660. The SOF 610 and EOF 660 fields mark frame boundaries. The header 620 contains a sequence number. The error detection/correction 650 is used to detect transmission errors and may be used to correct errors. According to one embodiment, the error correction/detection 650 is a cyclic redundancy code (CRC). Frames with a bad CRC are discarded by the scheduler. Because these requests will automatically be repeated during the following frame periods (discussed in detail below) no retransmission protocol is required. The other fields 640 may be used for functions such as flow control and error control.

The major part of the request frame 600 is the set of requests 630, one for each destination fabric port and priority level. Assuming an example system with 64 fabric ports and 4 priority levels, there would be 256 (64 ports×4 priorities/port) distinct requests 630 in the request frame 600. The request 630 indicates that there is data in an associated queue available for transmission. The request 630 may summarize the amount of data in the associated queue. The length of the requests 630 (e.g., number of bits) may be chosen taking into account limitations on the total length of the request frame 600, and the granularity of the amount of data in the associated queue needed by the scheduler (scheduling algorithms). For example, the request 630 may be encoded as 4 bits, thus providing 16 different options for defining the amount of data in the queue. That is, the request 630 can utilize 4 bits to describe the amount of data in the queue. The requests 630 can be encoded in various ways to define the amount of data in the associated queue. One approach is to quantize the amount of data it in terms of the frame period. That is, the request 630 may be encoded to indicate the number of data frames it would take to transport the data within the associated queue over the crossbar planes.

FIG. 7 illustrates an exemplary encoding scheme for quantizing the amount of data based on frames. As illustrated, the scheme identifies the amount of data based on ¼ frames. Since we have a 3-stage scheduler pipeline (request, grant, configure), the length quantization is extended beyond 3 frames to prevent bubbles in the pipeline.

In making scheduling decisions, the scheduler may base the decision on the priority of data. For example, if the request frame indicates that ingress module 1 priority 1 has 0.25 frame queued for egress module 3, and ingress module 2 priority 2 has 1.00 frame queued for egress module 3, then the fabric scheduler will chose the ingress module with the higher priority (ingress module 1) in making scheduling decisions for which ingress module should transmit data to egress module 3. In order to maintain high throughput, the scheduler also gives preference to requests to queues having full frames worth of data to send. For example, if the request frame indicates that ingress module 1 has only 0.25 frame of priority 1 queued for egress module 7, while ingress module 2 has 0.5 frame of priority 1 data queued for egress module 7, the fabric scheduler will select the ingress module having more data queued (ingress module 2) to transmit data to egress module 7. When the amount of data for a specific egress module and priority is equal, the scheduler may look to the total amount of data queued for the egress module. For example, if the request frame indicates that ingress module 1 has only 0.25 frame of priority 1 queued for egress module 9, and that ingress module 2 has 0.25 frame of priority 1 and 1.00 frame of priority 2 queued for egress module 9, then the fabric scheduler may select the ingress module having more data queued in total for egress module 9 (ingress module 2) as the amount of data for the highest priority was equal.

Because the scheduler may use a number of external criteria in making scheduling decisions, such as the amount of data queued at each priority level, the relative priorities of the requests, and the efficiency of the data path (how full the data frames will be), the scheduling process can be extremely difficult. According to one embodiment, the external set of scheduling criteria (priority, amount) is mapped into a set of internal scheduler priority levels (SPL).

FIG. 8A illustrates an exemplary SPL mapping table. For this example, it is again assumed that there are 4 priorities (priority 0-3) associated with each queue. For each priority, the mapping table differentiates between full frames and partial frames. A frame can be considered full if there are enough segments for that priority queue or lower priority queues associated with the same destination port. For example, if priority 1 for egress port 7 has ¾ of a frame, and priority 2 has ¼ of a frame, then the priority 1 queue is considered full. In the example above, there are four priorities and 2 statuses (full/partial) so that there is a total of 8 combinations that can be associated with the destinations. Accordingly, we will need a three bit SPL to set the 8 distinct internal priority levels. Combinations of the external priority (the highest priority level that is active in the frame) and the conditions such as full/partial frame are translated into one of the 8 internal priority levels (SPLs). As illustrated a full frame at priority 0-3 has SPL of 0-3 and partial frames at priority 0-3 have SPLs of 4-7.

The scheduler utilizes the SPLs (8 distinct priority levels) instead of external criteria to make scheduling decisions. In implementation, this mapping can be performed via a programmable lookup table that can be set based on the desired performance objectives. It should be noted that the above example only differentiated between full and partial frames. If the SPL was 4 bits and could thus have 16 distinct priorities, then the SPLs could distinguish between up to four different volumes of frames (e.g., 0 to ¼ frame, ¼ to ½ frame, ½ to ¾ frame, ¾ to 1; <1 frame, 1 to 2 frame, 2 to 3 frame, >3 frame).

Low priority partial frames will have low SPLs and data within the associated queues may never get scheduled (those requests may be starved). To prevent starvation of these requests (and the data within those queues) "age timers" will be implemented. The scheduler maintains an age timer for the request so that SPLs for requests that are old can be increased. For each ingress module, the scheduler maintains an N×P age timer value table (where N is the number of egress ports in the system and P is number of external priority levels). The age timer for a particular queue is incremented if the length is non-zero at the end of a scheduling cycle. The timer is reset to zero if data was transmitted in the previous frame period to the egress port and priority level associated with the age timer. A grant-service-bitmap (described later), transmitted from the ingress modules to the fabric scheduler as part of the request frames, indicates that data from a particular priority queue was sent as part of the previous data frame.

According to one embodiment, the age timers may be used to indicate when a queue has aged (exceeded some age timer threshold). A maximum age value (threshold) may be set lower for lower priorities. That is, the threshold for a priority 0 queue may be 30, while the threshold for a priority 3 may be 120. Alternatively, the age timers may provide an aging status that represents the amount of time on a continuum that the queue has not been processed. For example, if the queue has not been serviced for less than 30 cycles the aging status is a 0, if it is between 30-60 cycles it is a 1, between 60-90 cycles a 2 and so on. The higher the aging status the higher the priority that the queue is given by the scheduler. The aging status may be utilized in the formation of the SPLs.

FIG. 8B illustrates an exemplary SPL mapping table utilizing the aging status of the queue. As illustrated, aged out partial frames are given the same SPL as full frames. For example, if priority 0 data is part of a full frame the scheduler assigns a priority level (SPL) of 0, while the scheduler assigns an SPL of 4 for partial frame priority 0 requests. However, if the partial frame priority 0 request ages out, then the request gets promoted from SPL 4 to SPL 0. In this example, the aging status was simply aged out or not, and aged partial frames were given the same priority as full frames. However, the embodiment is not limited to these examples. In fact, if the SPL had more bits and thus provided more distinct priorities, the aging status could be made more granular (as defined above), more distinctions could be made between aged frames and non-aged frames (e.g., aged full frames given higher SPL than full frames), or some combination thereof.

Figure 9:
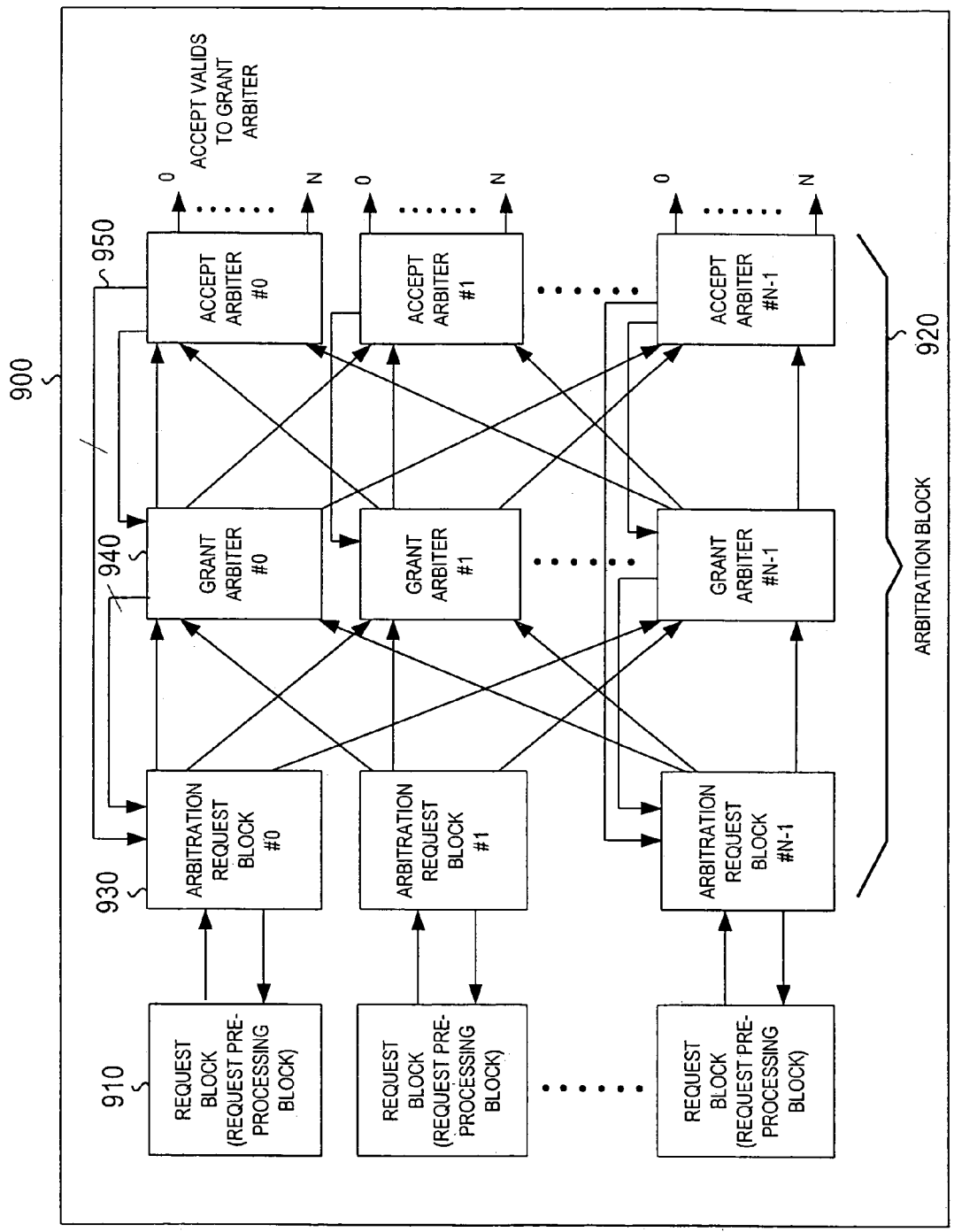
FIG. 9 illustrates an exemplary block diagram of a scheduling engine, according to one embodiment.

FIG. 9 illustrates an exemplary block diagram of a scheduling engine 900. The scheduling engine 900 includes request pre-processing blocks 910 and an arbitration block 920. The request pre-processing blocks 910 are associated with specific ingress ports. The request pre-processing block 910 for a specific ingress port assigns SPLs to the queues based on the external conditions (e.g., priority, aging, fullness) associated with the queues. If there are 64 egress ports and 4 priorities, there are 256 individual requests contained in a request frame received from an ingress port, each request corresponding to a queue associated with the ingress port. Using the example of FIGS. 8A and 8B, the re-quest pre-processing block will assign one of 8 SPLs to each request based on the external conditions.

The arbitration block 920 generates a switching schedule (ingress port to egress port links) based on the contents of the queues and the SPLs assigned thereto. The arbitration block 920 includes arbitration request blocks 930, grant arbiters 940 and accept arbiters 950. The arbitration request blocks 930 are associated with specific ingress modules. The arbitration request block 930 generates requests (activates associated bit) for those queues having requests for data to be transmitted. The arbitration request block 930 sends the requests one SPL at a time. That is, the arbitration request block 930 will send the SPL 0 requests when the arbitration block is set to SPL 0 (discussed in more detail later). For example, if ingress port 0 has SPL 0 data to be transmitted for egress ports 7, 11 and 21 it will send the corresponding requests to the grant arbitrators 940 associated with egress ports 7, 11 and 21. As the arbitration request blocks 930 are sending the requests for the same SPL (and thus same priority) there is no need for the requests to include the priority of the data. In fact, according to one embodiment the requests will be nothing more than an active bit (e.g., set to 1) to indicate that there is a request by the associated queue to transmit data. The active bit request is known as a request valid.

The grant arbiters 940 are associated with specific egress modules. The grant arbiters 940 are coupled to the arbitration request blocks 930 and are capable of receiving requests (request valids) from any number (0-to 63 in this example) of the arbitration request blocks 930. If a grant arbiter 940 receives multiple requests, the grant arbiter 940 will accept one of the requests (grant) based on some type of arbitration (e.g., round robin). For example, if ingress module 17 was the last request to be granted for egress module 11, and egress module 1 receives requests from ingress modules 10, 16, 19 and 21, the request for ingress module 19 will be granted as it is the next ingress module after the last processed ingress module. A grant valid corresponding to the request granted will be activated (e.g., set to 1) for the associated ingress port. The accept arbiters 950 are associated with specific ingress modules. The accept arbiters 950 are coupled to the grant arbiters 940 and are capable of receiving grants (grant valids) from any number (0 to 63 in this example) of the grant arbiters 940. If an accept arbiter 950 receives multiple grants, the accept arbiter 950 will accept one of the grants based on some type of arbitration (e.g., round robin). For example, if egress module 19 was the last grant to be accepted for ingress module 1, and ingress module 1 receives grants for egress modules 16, 18 and 21, the grant for egress module 21 will be accepted as it is the next egress module after the last processed egress module. An accept valid corresponding to the grant accepted will be activated (e.g., set to 1) for the associated egress port. If any accept arbiter 950 accepts a grant, the arbitration request block 930 associated with that ingress port is disabled for the remainder of the scheduling cycle. Likewise, if a grant is accepted for a certain grant arbiter 940, the grant arbiter is disabled for the remainder of the scheduling cycle.

Iterations of the scheduling process consists of the three phases: requests generated, requests granted, and grants accepted. At the end of an iteration the process continues for ingress and egress ports that were not previously associated with an accepted grant. The scheduler also includes an iteration manager (not illustrated in FIG. 9). The iteration manager is a central block within the scheduling engine that keeps track of the SPL for which the iterations are being performed. As previously mentioned, the scheduler processes requests one SPL at a time. The maximum number of iterations that can be performed is a design parameter that depends on the clock cycle time and other details. The iteration manager allows these iterations to be distributed among the different SPLs in a flexible manner, so that any unneeded iterations at a certain SPL can be accumulated and carried over to the next level. This is achieved by programming a table. The table contains, for each SPL, the maximum number of cumulative iterations allowed for all the SPLs up to and including that level.

FIG. 10 illustrates an exemplary SPL iteration table. For each SPL, the table includes the number of iterations and the maximum allowed cumulative number of iterations (programmed value). For example, the number of iterations for SPL 0 is 3 and the maximum cumulative number of iterations is also 3. The number of iterations associated with SPL 1 is 2 and the cumulative number of iterations is 5, and so on. Once iterations for one SPL are completed, the unmatched requests at that SPL are carried over to the next lower SPL and treated at the same priority level as the requests in this lower SPL. For example, if the three iterations were complete for SPL 0 but ingress port 2 still had an SPL 0 request for egress port 7, that request would be treated like the SPL 1 requests. In effect, the SPL for this request is increased (priority decreased) to match the SPLs of the requests to be processed in the next iteration.

In addition, unused iterations from one SPL are carried over to the next SPL. That is, if three iterations are dedicated for requests at SPL 0, but in iteration 1 it is determined that there are no requests at SPL 0, then the remaining two iterations could be used by requests at SPL 1. Thus, SPL 1 could utilize up to four iterations to grant valid requests for as many ingress to egress matches as possible. This iterative matching scheme (permitting rollover of SPLs) is referred to as Iterations Carried Over Next priority (ICON). The programmed value (maximum cumulative iteration) from FIG. 10 helps in the implementation of iteration carry over. The iteration manager knows that until the iteration counter reaches the programmed value that the iterations can continue for a particular SPL. For example, SPL 1 arbitration continues until 5 iterations have been completed. Thus, if during iteration number 2 for SPL 0 it is determined that no new grants can be given, then the iteration manager increments the SPL to 1. Now SPL 1 arbitration can proceed from iteration number 3 to 5.

The iteration manager can increment the SPL if (1) the number of iterations dedicated for that SPL is completed, or (2) the grant arbiters indicate that no new grants can be given (either because the grant arbiters did not receive any requests, or they are already matched). It should be noted that it will take at least one iteration to determine that no new grants can be issued (no matching can be done).

Referring back to FIG. 9, according to one embodiment, the arbitration used by the grant arbiters 940 and the accept arbiters 950 is a round robin arbitration. Accordingly, the grant arbiters 940 and the accept arbiters 950 incorporate a round-robin pointer for each SPL. The pointers associated with the grant arbiters 940 are used to select a winning request at an associated SPL during the current iteration. The pointers associated with the accept arbiters 950 are used to accept a winning grant at an associated SPL during the current iteration. Thus, when there are four internal priority levels SPL 0-3, there are four round-robin pointers within the grant arbiters 940 and within the accept arbiters 950. During each iteration, the round-robin pointer in the grant arbiter 940 corresponding to the SPL associated with that iteration is used to select the winning request. For example, if the current iteration being performed is for SPL-0 requests, the grant arbiters 940 will use the round-robin pointer 0 for selection of the ingress port to grant to. If the round-robin pointer 0 in the grant arbiter associated with port 5 is currently pointing to 12, and if there are active SPL-0 requests from ingress ports 5, 7, 12 and 21, the grant arbiter will select 12 as the egress port to send the grant (the first active request starting from its current setting 12). The round-robin pointers in the accept arbiters are used in the same way to select one of the grants received from the grant arbiters.

After the iterations have been completed, the scheduler performs a pointer update operation during which the round-robin pointers in the grant arbiters 940 and the accept arbiters 950 are updated as follows: If the request pointed by the round-robin pointer for a specific SPL in a grant arbiter 940 was matched successfully, (that is, the request was satisfied on completion of the iterations), then the round-robin pointer is updated to the next valid request (in round-robin order), considering the valid requests at that SPL and higher SPLs. In the above example, if the request from ingress port 12 was satisfied, the round-robin pointer 0 in the grant arbiter will be updated to 21, the ingress port number corresponding to the next valid request at SPL-0. If, on the other hand, the grant to ingress port 12 was not accepted, the round-robin pointer for SPL-0 in the grant arbiter is not modified (so that the grant arbiter will again select the request from ingress port 12 in the next scheduling cycle, during an iteration at SPL-0).

In a more complex example, assume that the round-robin pointer for SPL-1 in a grant arbiter 0 is pointing to port 12, and that the current iteration is being performed at the SPL-1 priority level. Assume that there are active SPL-1 requests for egress port 0 from ingress ports 5, 12, 17 and 21 during the current iteration; and that there are unmatched SPL-0 requests from ingress ports 6, 16, 19 and 25, which are also submitted during the current iteration. Also assume that the scheduler was able to satisfy the SPL-1 request from port 12. Then during the pointer update operation, the round-robin pointer for SPL-1 is updated to 16, the port number corresponding to the next valid request, considering both SPL-0 and SPL-1 requests submitted during the iteration.

The round-robin pointers in the accept arbiters 950 are updated during the pointer update operation in a similar manner, except that, while updating a round-robin pointer associated with a port i, only the requests originating from the ingress port i are considered. Thus, if the request pointed by the round-robin pointer for a specific SPL in an accept arbiter i was matched successfully, then the round-robin pointer is updated to the next valid request (in round-robin order), considering the valid requests from ingress port i at that SPL and higher SPLs. For example, assume that there are active SPL-0 requests from ingress port 0 for egress ports 5, 12, 17 and 21; and active SPL-1 requests for egress ports 6, 15, 19 and 25. Also assume that the current iteration is at SPL-1, during which the scheduler was able to satisfy the SPL-1 request to egress port 15. Then during the pointer update operation, the round-robin pointer for SPL-1 is updated to 17, the port number corresponding to the next valid request, considering both SPL-0 and SPL-1 requests.

In one embodiment, the pointer updates will be performed considering the request that was satisfied was for a full frame of data or less than a frame at a single priority level. If the request that was satisfied was for less than a full frame of data, then the lower-priority requests for the same pair of ingress-egress ports may also be satisfied by the same grant, so that the pointers for the corresponding SPLs can be updated as if their requests were satisfied. The arbitration request block 930 uses the SPLs in two different ways depending on whether the scheduler is arbitrating (scheduling phase) or updating the pointers (pointer update phase). During the scheduling phase, the arbitration request block 930 sends out the requests for the SPL at which the arbitration is currently processing, as well as the requests remaining unmatched at all lower SPLs (higher priorities). For example, if SPL 2 is the current level of the iteration, then the unmatched SPL 0, SPL 1, SPL 2 requests are sent out for arbitration. During the pointer update phase, the grant and accept arbiters update their per-SPL round-robin pointers one SPL at a time. Therefore, the arbitration request block 930 sends out only requests of the SPL that is currently being processed.

Figure 11:
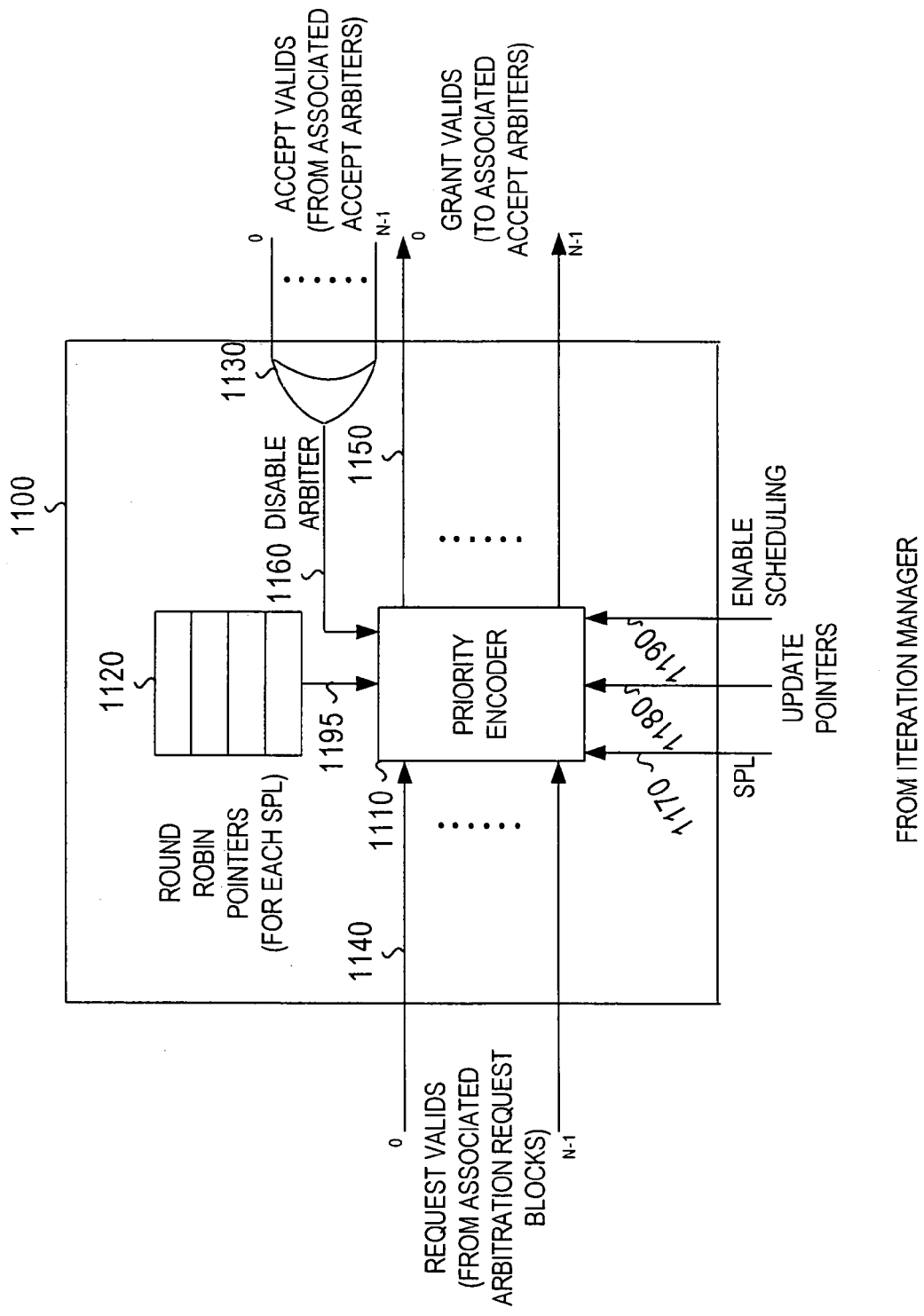
FIG. 11 illustrates an exemplary grant arbiter, according to one embodiment.

FIG. 11 illustrates an exemplary grant arbiter 1100. The grant arbiter 1100 includes a priority encoder 1110, a round robin pointer for each SPL 1120, and an OR gate 1130. The priority encoder 1110 has a plurality of inputs 1140 connected to the arbitration request blocks (one input per arbitration request block). The inputs 1140 are capable of receiving a request (request valid) from the arbitration request blocks (ingress ports). The priority encoder 1110 also has a plurality of outputs 1150 that are connected to the accept arbiters (one output per accept arbiter). The outputs 1150 are capable of transmitting a grant (grant valid) to any one of the accept arbiters (ingress ports). The priority encoder 1110 also includes a disable arbiter input 1160. The disable arbiter input 1160 receives the output of the OR gate 1130, which receives the accepts (accept valids) from the accept arbiters connected to the grant arbiter 1100. If any of the accept valids associated with the grant arbiter 1100 are active (indicating that a corresponding grant was accepted), the grant arbiter 1100 is disabled as the egress port associated with that grant arbiter 1100 has already been matched with an ingress port.

The priority encoder 1110 further includes an SPL input 1170, an update pointers input 1180 and an enable scheduling input 1190. The inputs are received from the iteration manager. The SPL input 1170 receives an input SPL corresponding to the SPL of the current iteration and the priority encoder 1110 performs scheduling based on the input SPL. The enable scheduling input 1190 becomes active when the scheduler (grant arbiter 1100) is in the scheduling phase (is arbitrating). The update pointers input 1180 becomes active when the scheduler (grant arbiter 1100) is in the pointer update phase (updating the pointers). The priority encoder 1110 further includes a pointer input 1195 for receiving the round robin pointers 1120 for each SPL. The round robin pointers 1120 indicate the starting ingress port to have a request granted. Scheduling will begin at this ingress port, that is, the priority encoder will select the first active request valid signal starting at this position and proceeding cyclically through the requests.

When the enable scheduling signal is active (enable scheduling input 1190 receives an active input), the priority encoder 1110 utilizes the input SPL 1170 and the round robin pointer 1120 for the input SPL to select a request valid signal to be granted. The grant valid signal corresponding to the selected request is then made active. The grant valid signals are sent to the accept arbiters.

When the update pointers signal 1180 is active, the grant arbiter 1100 updates the round-robin pointer value corresponding to the input SPL, as previously described. Initially, the pointer value corresponding to the input SPL is read. A determination of the next valid request after the pointer value is made by utilizing the priority encoder (Find Next One logic) 1110. If the request valid signal corresponding to the current pointer value is inactive (indicating that the request was matched in the current cycle), the pointer is updated with the output of the priority encoder. Otherwise, the pointer value remains unchanged. The request blocks mask out the requests matched during the current scheduling cycle while the pointers are getting updated. Thus, in the case where the request pointed to by the current pointer value has been matched in the current frame, during the pointer update phase the request will be seen inactive by the grant arbiter block, and hence the pointer will be updated to the next valid request.

Figure 12:
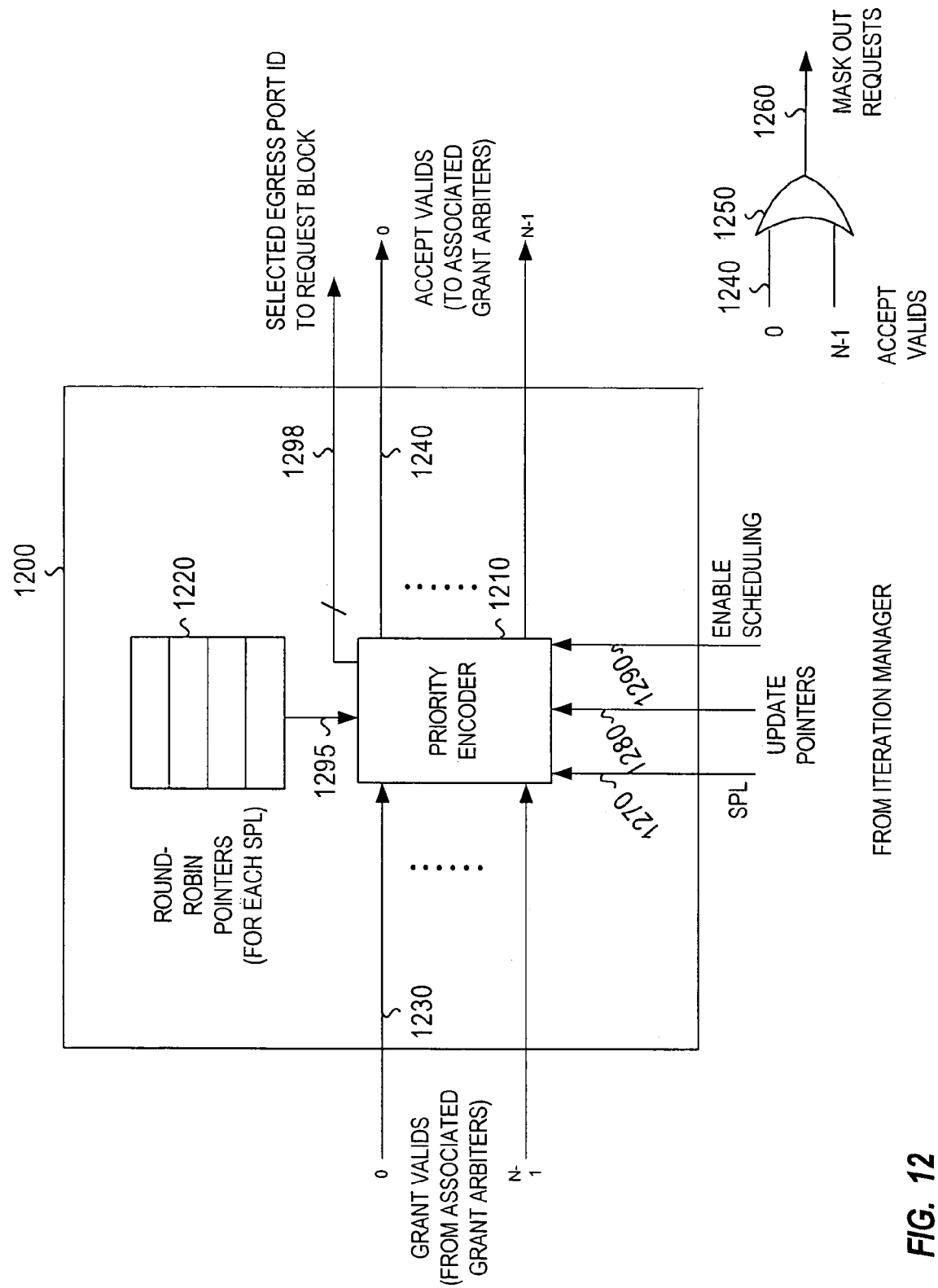
FIG. 12 illustrates an exemplary accept arbiter, according to one embodiment.

FIG. 12 illustrates an exemplary accept arbiter 1200. The accept arbiter 1200 includes a priority encoder 1210 and a round robin pointer for each SPL 1220. The priority encoder 1210 has a plurality of inputs 1230 connected to the grant arbiters (one input per grant arbiter). The inputs 1230 are capable of receiving a grant (grant valid) from the grant arbiters. The priority encoder 1210 also has a plurality of outputs 1240 that are connected to the grant arbiters (one output per grant arbiter). The outputs 1240 are capable of transmitting an accept (accept valid) to an associated grant arbiter (e.g., the accept arbiter corresponding to port 1 may assert the accept valid signal to grant arbiter 7, when it decides to accept a grant from egress port 7 to ingress port 1). As previously discussed with respect to FIG. 11, a grant arbiter receives the associated accept valid signals from the accept arbiters 1200 at an OR gate, and the output of the OR gate provides the disable signal. The outputs 1240 are also fed through an OR gate 1250 and a result 1260 is provided to the associated arbitration request block (e.g., the OR of all accept valids from accept arbiter 1 is provided to arbitration request block 1). The output of the OR gate 1260 acts as a disable (mask out) of the arbitration request block as the ingress port associated with that arbitration request block has already been matched to an egress port.

The accept arbiter 1200 further includes an SPL input 1270, an update pointers input 1280 and an enable scheduling input 1290. These inputs are received from the iteration manager. The SPL input 1270 receives an input SPL (current SPL) and the priority encoder 1210 performs scheduling based on the input SPL. The enable scheduling input 1290 becomes active when the scheduler (accept arbiter 1200) is in the scheduling phase (is arbitrating). The update pointers input 1280 becomes active when the scheduler (accept arbiter 1200) is in the pointer update phase (updating the pointers). The priority encoder 1210 further includes a pointer input 1295 for receiving the round robin pointers 1220 for each SPL. The round robin pointers 1220 indicate the starting egress port to have a request granted. Scheduling will begin at this egress port, that is, the priority encoder will select the first active grant valid signal starting at this position and proceeding cyclically through the grants.

When the enable scheduling signal 1290 is active, the priority encoder 1210 utilizes the input SPL and the round robin pointer for the input SPL to select a grant valid signal to be accepted. The accept valid signal corresponding to the selected grant is then made active. Once an accept valid is activated, the accept arbiter 1200 sends the address 1298 of the selected egress module to the request pre-processing block, which then forms the grant message.

When the update pointers signal 1280 is active, the accept arbiter 1200 updates the round-robin pointer value corresponding to the input SPL, as previously described. Initially, the pointer value corresponding to the input SPL is read. A determination of the next valid request after the pointer value is made by utilizing the priority encoder (Find Next One logic) 1210. The inputs to the priority encoder now are the requests from the ingress port corresponding to the accept arbiter. If the accept valid signal corresponding to the current pointer value is inactive (indicating that the grant was accepted in the current cycle), the pointer is updated with the output of the priority encoder. Otherwise, the pointer value remains unchanged. The request blocks mask out the requests matched during the current scheduling cycle while the pointers are getting updated. Thus, in the case where the request pointed to by the current pointer value has been accepted in the current frame, during the pointer update phase the request will be seen inactive by the accept arbiter block, and hence the pointer will be updated to the next valid accept.

As previously mentioned, a grant is formed by the scheduler at the end of the scheduling cycle for transmission to the ingress port and the egress ports. The grant is sent by the fabric scheduler in a grant frame similar to the request frame it receives from the ingress fabric interface modules. The grant to the ingress module identifies which egress module it should send data to. The ingress module knows which queues are associated with the egress module and thus can form the data frame from those queues. According to one embodiment, the segments used to create the data frame are selected from the highest priority queues first (e.g., priority 0). If the highest priority queue does not have enough segments or has no data, the ingress module moves to the next priority queue to generate the frame. Once the frame is full, and the crossbar is configured, the frame is transmitted to the switching fabric. Starting with the highest priority queues may cause some queues to starve (have segments that are not sent for long periods of time). As previously discussed, the scheduler may take account of the age of the data within the queues in the formation of the SPLs (e.g., partial aged frame is given same SPL as full frame) and thus the selection of requests for that arbitration request block (ingress module). However, if the scheduler selects a request from a particular ingress module for a particular egress module based on a lower level priority, the particular ingress module may have received higher level data prior to the dequeuing of data from queues associated with the particular egress port. Accordingly, the higher priority queue will be used to form the frames and the lower priority queue may again not be serviced.

According to one embodiment, the grant for the ingress module may include the priority as well as the egress module. When the priority level is identified, the ingress module will start dequeuing data from the identified priority queue first. Starting from a specific priority level would prevent the lower priority queues from starving (not being transmitted for a long time). The priority may be included all of the time, or only when the age timers indicate that the data in the queue is starving or is soon to be starving (e.g., has exceeded some time threshold).

The grant message to the ingress module is sent out at the end of the scheduling/grant frame (stage II), so as to give the scheduler enough time to compute the matching. That is, the scheduler can start transmitting the grant frame while it is still working on the computation of the matching, and the result is needed only close to the end of the frame time. This avoids an additional frame time worth of delay in the scheduling pipeline.

The grant frame to the egress module identifies the ingress module that will be transmitting data to the egress module. The egress module can compare the frame received from the crossbar with the grant to determine if the correct data was sent. A mismatch in the frame received and the grant indicates some type of error in transmission and results in discarding of the frame.

Figure 13:
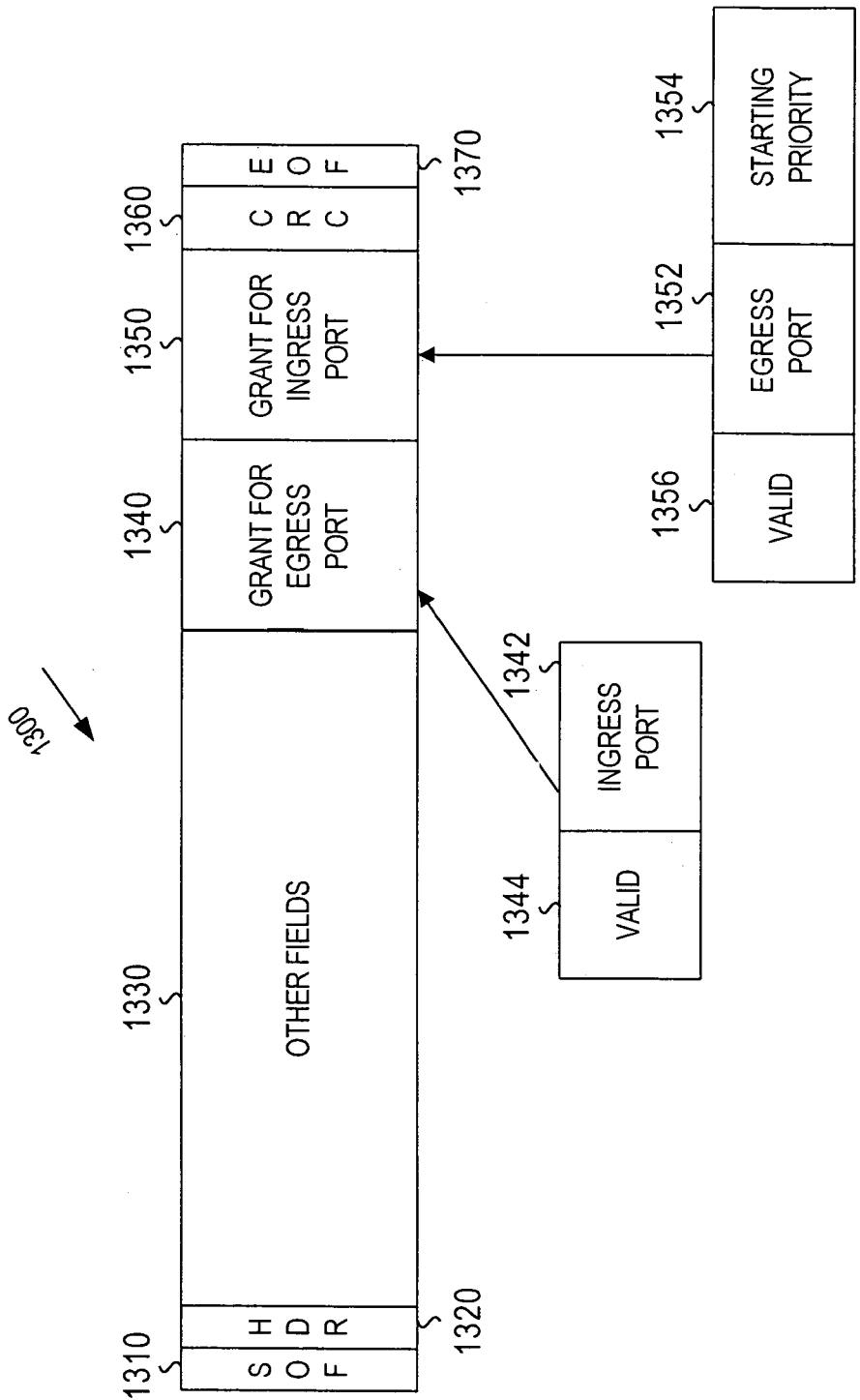
FIG. 13 illustrates an exemplary grant frame, according to one embodiment.

If both the ingress and egress modules associated with the same fabric port are packaged together (e.g., in the same chip or board), the two grant messages could be combined into a single grant frame. FIG. 13 illustrates an exemplary grant frame 1300, combining the messages to ingress and egress fabric interface modules associated with a fabric port. The grant frame 1300 includes a start of frame (SOF) delimiter 1310, a frame header 1320, other fields 1330, an egress module grant 1340, an ingress module grant 1350, an error detection/correction field 1360, and an end of frame (EOF) delimiter 1370. The other fields 1330 can be used for communicating other information to the ingress and egress modules, such as flow control status. The egress module grant 1340 may include an ingress module (input port) number 1342 representing the ingress module it should be receiving data from, and a valid bit 1344 to indicate that the field is valid. The ingress module grant 1350 may include an egress module (output port) number 1352 representing the egress module to which data should be sent, a starting priority level 1354 representing the priority level of the queue that should be used at least as a starting point for de-queuing data to form the frame, and a valid bit 1356 to indicate that the information is a valid grant. The presence of the starting priority field enables the scheduler to force the ingress module to start de-queuing data from a lower priority queue when a higher-priority queue has data. This allows the system to prevent starvation of lower-priority data. The error detection/correction field 1360 (e.g., a Cyclic Redundancy Code (CRC)) is used to detect errors in the grant frame.

If the grant includes the priority, the ingress module should start de-queuing data at the given priority. However, data from other priority levels may be sent as part of the same frame if the specified priority level does not have a full frame of data. It is important for the fabric scheduler to receive information from the ingress module on which priorities were actually serviced while sending the frame. This information is sent back from the ingress module to the fabric scheduler as a grant service bitmap.

FIG. 14 illustrates an exemplary grant service bitmap. The grant service bitmap includes one bit for each priority level. If segments from that priority were part of the data frame that was sent during the last frame time the associated bit is active (set to 1). For example, if a frame contains priority 0 and priority 2 segments, the grant service bitmap will set the bits corresponding to priority 0 and priority 2 active (as illustrated). According to one embodiment the grant service bitmap is contained within a request frame. The bitmap corresponds to the grant that was last serviced by the ingress module. For example, if scheduler sends a grant in Frame 3, the ingress module de-queues segments and forms a data frame during frame period 4, and the ingress module sends the grant service bitmap to the scheduler in frame period 5. When the scheduler receives the bit map having bits 0 and 2 active it knows that segments of priority 0 and priority 2 were part of the data frame sent during the last frame time. Once the scheduler determines that segments were transmitted for a particular queue, the age timer is reset for that queue. If the queue was considered aged and accordingly was given a higher SPL, the SPL will be lowered as the queue will not be considered aged anymore (age timer reset).

Although the various embodiments have been illustrated by reference to specific embodiments, it will be apparent that various changes and modifications may be made. Reference to "one embodiment" or "an embodiment" means that a particular feature, structure or characteristic described in connection with the embodiment is included in at least one embodiment. Thus, the appearances of the phrase "in one embodiment" appearing in various places throughout the specification are not necessarily all referring to the same embodiment.

Different implementations may feature different combinations of hardware, firmware, and/or software. For example, some implementations feature computer program products disposed on computer readable mediums. The programs include instructions for causing processors to perform techniques described above.

The various embodiments are intended to be protected broadly within the spirit and scope of the appended claims.

What is claimed is:

1. A switching device comprising
a segmentation unit to receive packets and to divide the packets having a length greater than a maximum segment length into multiple segments;
a plurality of queues to store the segments, wherein the queues are associated with sources and destinations;
a request generator to generate requests to transmit the segments, wherein a request indicates external factors including amount of data contained in the queue and at least some subset of priority and age;
a scheduler to receive the requests and assign the requests an internal priority based on the external factors, wherein the scheduler processes the requests for the queues by internal priority in order to generate grants; and a framer, responsive to said scheduler, to aggregate a plurality of the segments for the queues that received a grant to form a frame and to transmit the frame to an associated destination, wherein the frame may contain segments associated with different packets.

2. The device of claim 1, wherein said scheduler performs multiple arbitration iterations in order to generate the grants.

3. The device of claim 2, wherein said scheduler performs multiple iterations per internal priority.

4. The device of claim 3, wherein if the requests for one priority are granted prior to completion of the multiple iterations associated with that internal priority remaining iterations are used by next internal priority.

5. The device of claim 3, wherein if the requests for one priority are not granted by the completion of the multiple iterations associated with that internal priority, any remaining requests are processed as if they were next internal priority level requests.

6. The device of claim 5, wherein the requests indicate cumulative amount of data within the queues.

7. The device of claim 1, wherein the cumulative amount of data is quantized based on number of frames.

8. The device of claim 1, wherein the age is waiting time of the segment at head of the queue.

9. The device of claim 1, wherein said scheduler includes:
a plurality of request pre-processors to assign the internal priority; and
an arbitrator to arbitrate between the requests received and generate the grants.

10. The device of claim 1, further comprising a switching matrix to provide selective connectivity between the sources and the destinations.

11. The device of claim 10, wherein the scheduler configures the switching matrix based on the grants.

12. The device of claim 1, wherein said scheduler includes:
a plurality of grant arbiters to arbitrate between requests received and select a request to issue a grant for, wherein the plurality of grant arbiters is equal in number to the number of destinations, and wherein the grant arbiters are associated with specific destinations; and
a plurality of accept arbiters to arbitrate between grants received and select a grant to accept, wherein the plurality of grant arbiters is equal in number to number of sources, and wherein the grant arbiters are associated with specific sources.

13. The device of claim 12, wherein the grant arbiters receive a request from each source and the accept arbiters are capable of receiving a grant from each grant arbiter.

14. The device of claim 13, wherein the grant arbiter and the accept arbiter associated with an accepted grant are not included in a next iteration of the scheduler.

15. The device of claim 1, further comprising
a deframer to extract the segments from the frame; and
a reassembly unit to combine the segments making up a complete packet together to generate the packet.

16. The device of claim 1, further comprising a striper to stripe the frame across a plurality of channels.

17. A method comprising:
receiving data packets;
forming segments from the received data packets, wherein the data packets received having a length greater than a maximum segment length are divided into multiple segments;
storing the segments in queues, wherein the queues are associated with a source and a destination;
generating requests to transmit the segments from the queues, wherein a request indicates external factors including amount of data contained in a queue and at least some subset of priority and age;
receiving the requests at a scheduler and assigning the requests an internal priority based on the external factors;
processing the requests for the queues by the internal priority in order to generate the requests;
aggregating a plurality of the segments, responsive to said processing the requests, to form a frame, wherein the frame may contain the segments associated with different data packets; and
transmitting the frame to the associated destination, wherein the segments within the frame are transmitted together.

18. The method of claim 17, wherein said processing includes performing multiple arbitration iterations per internal priority in order to generate the grants.

19. The method of claim 18, wherein said processing includes utilizing remaining iterations as part of next internal priority iterations when requests for a previous internal priority are granted prior to completion of the multiple iterations associated with the previous internal priority.

20. The device of claim 18, wherein said processing includes processing any remaining requests as a part of next internal priority level requests if requests for a previous internal priority are not granted by completion of the multiple iterations associated with the previous internal priority.

21. The method of claim 18, wherein said processing includes excluding sources and destinations associated with an accepted grant from a next iteration.

22. The method of claim 17, wherein the requests indicate cumulative amount of data within the queues.

23. The method of claim 22, wherein the cumulative amount of data is quantized based on number of frames.

24. The method of claim 17, wherein the age is waiting time of the segment at head of the queue.

25. The method of claim 17, further comprising
extracting the segments from the frame; and
combining the segments making up a complete packet together to generate the packet.

26. The method of claim 17, wherein said transmitting includes striping the frame across a plurality of channels.

27. A store and forward device comprising
a plurality of Ethernet cards to receive data from and transmit data to external sources, wherein the plurality of Ethernet cards include
an ingress interface module to receive packets, store the packets as segments in queues associated with at least some subset of destination and priority, aggregate multiple segments together to form a frame, transmit the segments within the frame together, and generate requests for permission to transmit data from the queues, wherein the segments larger than a maximum segment size are divided into the multiple segments, wherein the frames may include segments associated with different packets, and wherein the requests include external factors including at least some subset of quantity, priority and age; and
an egress interface module to receive the frames, divide the frames into the segments making up the frames, store the segments in a queue, monitor the queues for complete packets, and reassemble a packet after the segments making up the packet are received;
a switching matrix to provide selective connectivity between the Ethernet cards;

a backplane consisting of a plurality of channels to connect the plurality of Ethernet cards to the switching matrix; and a scheduler to receive the requests, assign the requests an internal priority based on the external factors, and to configure the switching matrix accordingly, wherein the scheduler processes the requests for the queues by internal priority in order to generate grants.

28. The device of claim 27, wherein said scheduler includes:

a plurality of grant arbiters to arbitrate between requests received and select a request to issue a grant for, wherein the plurality of grant arbiters is equal in number the to number of destinations, and wherein the grant arbiters are associated with specific destinations; and a plurality of accept arbiters to arbitrate between the grants received and select a grant to accept, wherein the plurality of grant arbiters is equal in number the to number of sources, and wherein the grant arbiters are associated with specific sources.

29. The device of claim 28, wherein the grant arbiters receive a request from each source and the accept arbiters receive a grant from each grant arbiter.

30. The device of claim 28, wherein the grant arbiter and the accept arbiter associated with an accepted grant are not included in a next iteration of the scheduler.

31. A store and forward device comprising
an ingress interface including
   a receiver to receive packets from external sources;
   a segmentation unit to divide the packets having a length greater than a maximum segment length into multiple segments;
   a plurality of queues to store the segments, wherein the queues are associated with sources and destinations;
   a request generator to generate requests to transmit the segments, wherein a request indicates external factors including quantity, priority and age;
   a framer to aggregate a plurality of the segments for the queues that received a grant to form a frame, wherein the frame may contain the segments associated with different packets; and
   a transmitter to transmit the frame to an associated destination an egress interface including
   a receiver to receive the frame;
   a deframer to extract the segments from the frame;
   queues to store the segments;
   a monitor to monitor the queues for complete packets; and
   a reassembly unit to combine the segments making up a complete packet together to generate the packet;

a switching matrix to provide selective connectivity between the ingress interface and the egress interface;

a backplane consisting of a plurality of channels to connect the ingress interface and the egress interface to the switching matrix; and a scheduler to receive the requests, assign the requests an internal priority based on the external factors, and to configure the switching matrix accordingly, wherein the scheduler processes the requests for the queues the by internal priority in order to generate the grants.

32. The device of claim 31, wherein said scheduler includes:

a plurality of grant arbiters to arbitrate between requests received and select a request to issue a grant for, wherein the plurality of grant arbiters is equal in number the to number of egress interfaces, and wherein the grant arbiters are associated with specific egress interfaces; and a plurality of accept arbiters to arbitrate between grants received and select a grant to accept, wherein the plurality of grant arbiters is equal in number to number of ingress interfaces, and wherein the grant arbiters are associated with specific ingress interfaces.

* * * * *